United States Patent [19]
Sekihata et al.

[11] Patent Number: 5,506,834
[45] Date of Patent: Apr. 9, 1996

[54] COMMUNICATION APPARATUS FOR COMMUNICATING BETWEEN LANS THROUGH A WIDE AREA NETWORK

[75] Inventors: Osamu Sekihata; Tetsuo Nishino, both of Kawasaki, Japan

[73] Assignee: Fujitsu Limited, Kanagawa, Japan

[21] Appl. No.: 283,785

[22] Filed: Aug. 1, 1994

[30] Foreign Application Priority Data

Dec. 1, 1993 [JP] Japan .................................. 5-301644

[51] Int. Cl.⁶ .................................................. H04L 12/46
[52] U.S. Cl. ............................ 370/17; 370/79; 370/84; 370/85.13; 370/110.1
[58] Field of Search ............................ 370/17, 79, 84, 370/85.7, 85.13, 85.14, 95.1, 110.1

[56] References Cited

U.S. PATENT DOCUMENTS

| | | | |
|---|---|---|---|
| 4,984,264 | 1/1991 | Katsube | 370/17 X |
| 5,040,171 | 8/1991 | Osaki | 370/17 |
| 5,179,555 | 1/1993 | Videlock et al. | 370/85.13 |
| 5,313,467 | 5/1994 | Varghese et al. | 370/84 X |
| 5,361,259 | 11/1994 | Hunt et al. | 370/84 |

*Primary Examiner*—Douglas W. Olms
*Assistant Examiner*—Russell W. Blum

[57] ABSTRACT

An amount-of-data identifying portion identifies the amount of data transmitted by referring to a specific portion in the upper layers of the information transmitted from the terminal of a LAN, and a bandwidth control line monitor portion calculates the band which is necessary for communication. Communication between LANs is executed through the number of wide area network interface portions which is determined on the basis of the calculated band. In the case that the communication is performed after securing the band corresponding to the traffic characteristics (transfer speed, etc.) declared to the network, the amount-of-data identifying portion identifies the amount of data transmitted by referring to a specific portion in the upper layers of the information transmitted from the terminal of a LAN, a traffic characteristics calculator calculates the traffic characteristics on the basis of the amount of data transmitted, a traffic characteristics declaring portion declares the calculated traffic characteristics to the network, and the network communicates on the basis of the declared traffic characteristics.

6 Claims, 16 Drawing Sheets

COMMUNICATION APPARATUS FOR COMMUNICATING BETWEEN LANS THROUGH A WIDE AREA NETWORK

BACKGROUND OF THE INVENTION

1. Field of the Invention

The present invention relates to a communication apparatus for communicating between LANs through a wide area network or a communication apparatus for communicating with the traffic characteristics declared to the network before communication and, more particularly, to a communication apparatus for communicating at a traffic speed which corresponds to the amount of data transmitted.

2. Description of the Related Art

Communication between LANs

In order to interconnect distant LANs (Local Area Networks) with each other, a so-called wide area network (WAN) such as telephone network, data exchange network, ISDN and a leased line is inserted between the LANs. A router or a brouter is provided with functions of a bridge and a router is provided between each LAN and the WAN. In the communication system for connecting the LANs through a WAN, when a frame is sent from a terminal with a network address attached thereto, the router fetches the frame and transmits the frame to the LAN at the other end through the WAN by reference to the network address, the router connected to the LAN at the other end fetches the frame and transmits it to the LAN, and the terminal at the other end fetches the frame.

The band of the line in the WAN using the present public data network is so narrow that even in the communication between LANs, if the traffic is heavy, the transmission speed suddenly lowers to as low as 2400 bps, and even by using INS-C, which has a comparatively high speed, the transmission speed lowers to 64 Kbps. Therefore, a file transfer, which would be finished in several seconds within the same LAN, takes a much longer time through a WAN. Thus, the effective use of a WAN which enables the high-speed data transfer between LANs is an important problem which remains unsolved.

As an effective use of a line resource (network), a dynamic band assigning system is known, as described in the pending U.S. patent application Ser. No. 08/198,070 (application date: Feb. 17, 1994, Title: LAN-WAN-LAN COMMUNICATION METHOD AND APPARATUS FOR LAN-WAN CONNECTION). In this dynamic band assigning system, the traffic density is detected and the number of lines corresponding to the traffic density are assigned. In order to detect the traffic density in this system, the following method is adopted.

(1) The number of data remaining in the output buffer is counted, (2) the data dealt with are restricted to HDLC (High Level Data Link Control Procedure) and the number of frames is counted, or (3) the data dealt with are restricted to HDLC and the number of time fill flags are counted, and the traffic density is detected on the basis of the count value and, when the traffic density is high, the band is enlarged.

Such a dynamic band assigning system, however, suffers from the following problems. A first problem is that since the band is enlarged by increasing the number of channels or the like after the detection of the traffic density, it takes much time to secure the band. A second problem is that since whether or not there is a shortage of the bandwidth is only judged in the dynamic band assigning system, the appropriate band must be obtained by gradually enlarging the band by a predetermined amount, so that rapid and flexible assignment of band is sometimes impossible. A third problem is that a change in the transfer speed (band) during data transfer stops the transmission of data so as to establish synchronism, which is a problem in the reliability.

For example, if it is assumed that the band of 64 Kbps is assigned at present, in order to transmit data which requires a band of 384 Kbps, the traffic density is detected after the data transmission is started, and it is judged whether or not the band large enough for the traffic density is secured. If the band is too narrow, a channel is added so as to enlarge the band from 64 Kbps to 128 Kbps. However, if the band is still narrow, another channel is provided so as to enlarge the band from 128 Kbps to 192 Kbps. This operation is repeated so as to sequentially obtain the appropriate band. According to such a dynamic band assigning system, when the amount of traffic data is small and the transfer time is short, the desired band is not secured until the data transfer is almost finished, so that efficient data transfer is impossible.

In addition, although it is possible to select the method of setting the increment value of the band (in the above example, a method of setting the band to 320 Kbps at one time), but this method lacks in flexibility, so that the increment value is too large in another circumstance, and since it is impossible to set a band minutely, it is not practical from the point of view of economy.

ISDN communication/frame relay communication/ATM communication

In ISDN communication, frame relay communication and ATM communication, the originating terminal indicated the traffic characteristics (transfer speed (band), average speed, peak speed) to the network at calling. The network judges whether or not there is a path between the originating terminal and the terminating terminal which corresponds to the declared traffic characteristics. If there is such a path, the network connects these terminals through the path.

FIG. 17 is an explanatory view of the control procedure between the network and the user in the case of ISDN communication.

When the terminating terminal 2 is called by inputting a telephone number from the originating terminal 1 of a transmitter, a link is set between the originating terminal 1 and a network 3. When the link is set up, the originating terminal 1 supplies a SET UP message (call set-up request message) to the network 3. The network 3 transfers the SET UP message to the terminating terminal 2 and supplies a CALL PROC message to the originating terminal 1 to inform that the terminating terminal 2 is in the process of setting a call. When the processing for setting a call is finished, the terminating terminal 2 makes a ring tone and supplies an ALERT message (informing that the terminal 2 is being called) to the originating terminal 1 through the network 3. When a man answers the phone by taking up the receiver of the terminating terminal (off hook), the terminating terminal 2 sends a CONN message (informing that the phone is answered) to the network 3. The network 3 then sends a CONN ACK message (acknowledge) to the terminating terminal 2 and sends the CONN message to the originating terminal 1. When the originating terminal 1 receives the CONN message, it sends the CONN ACK message (acknowledge) to the network 3. In this manner, both terminals 1, 2 are communicated with each other, thereby enabling communication.

When the receiver of the originating terminal 1 has hung up (on hook) after communication is finished, the originating terminal 1 outputs a DISC message (request for disconnection) to the network 3. The network 3 transfers the DISC message to the terminating terminal 2. When the terminating terminal 2 receives the DISC message, it releases a call reference and sends a REL message (completion of the channel disconnection and call reference release request) to the network 3. The network 3 disconnects the channel, releases the call reference, and transfers the REL message to the originating terminal 1. When the originating terminal 1 receives the REL message, it releases the call reference and sends a REL COMP message (completion of the release of the channel and the call reference) to the network 3. When the network 3 receives the REL COMP message, it releases the channel and the call reference and supplies the REL COMP message to the terminating terminal 2, thereby ending the calling control.

Such a SET UP message and a CONN message between the user and the network includes traffic characteristics (transfer speed, etc.). FIG. 18 is an explanatory view of a SET UP message. A SET UP message is largely divided into a common portion (a) and an individual portion (b). The common portion (a) contains a protocol discriminator, the octet length of a call reference, a call reference, a SET UP message type, etc. The individual portion (b) contains various information. Various information is composed of an information element identifier IID, an octet length LG of an information element, and an information content ICT. In FIG. 18, information is composed of five information elements: ① bearer capability information, ② user channel information, ③ the number of the originating party, ④ the number of the terminating party and ⑤ incoming call logging information identification. The bearer capability information (1) includes an exchange mode (line or packet), information transfer capability (sound or digital), information transmission speed (64 Kbps, 384 Kbps, etc.).

In ISDN communication, frame relay communication or ATM communication, the originating terminal declares the traffic characteristics (transfer speed (band), average speed, peak speed, etc.) which are stationarily set in advance to the network and the terminating terminal by a SET UP message, and receives the notification on the reception of the SET UP message through a CONN message. For this reason, in the case of executing data communication having a high burst possibility, it is impossible to declare the appropriate traffic characteristics which correspond to the amount of data to the network and to communicate with the other party on the basis of the traffic characteristics. Efficient use of the network is therefore important for high-speed transfer.

As described above, according to a conventional LAN-LAN communication system, rapid band control is impossible so that efficient data transfer is also impossible.

In addition, in a conventional LAN-LAN communication system, it is impossible to declare the appropriate traffic characteristics which correspond to the amount of data to the network and to communicate with the other party on the basis of the traffic characteristics.

SUMMARY OF THE INVENTION

Accordingly, it is a first object of the present invention to eliminate the above-described problems in the related art and to provide a communication apparatus for communicating between LANs while assigning an appropriate band in correspondence with the amount of data transmitted.

It is a further object of the present invention to provide a communication apparatus which declares the traffic characteristics corresponding to the amount of data transmitted to the network so that the network communicates the data on the basis of the traffic characteristics.

It is a another object of the present invention to provide a communication apparatus which enables data communication having a high burst probability with the traffic characteristics which correspond to the amount of data transmitted.

According to a first aspect of the present invention, there is provided a communication apparatus comprising a LAN interface portion; a plurality of wide area network interface portions; an amount-of-data identifying portion for identifying the amount of data transmitted to the other party from the information transmitted from the terminal of the LAN; and a bandwidth controller for calculating the band which is necessary for communication between LANs on the basis of the amount of data, wherein the number of the plurality of wide area network interface portions are determined on the basis of the calculated necessary band.

According to a second aspect of the present invention, there is provided a communication apparatus comprising a LAN interface portion; a plurality of wide area network interface portions; an amount-of-data identifying portion for identifying the amount of data transmitted to the other party from the information transmitted from the terminal of the LAN; a traffic characteristics calculator for calculating the traffic characteristics at the time of communication on the basis of the amount of data; and a traffic characteristics notifying portion for notifying the calculated traffic characteristics to the network prior to communication so as to communicate with the other party with the declared traffic characteristics.

According to a third aspect of the present invention, there is provided a communication apparatus comprising means for calculating the traffic characteristics during communication on the basis of the amount of data; and means for declaring the calculated traffic characteristics to the network, wherein the network changes the traffic characteristics during communication so as to communicate with the changed traffic characteristics.

Other features and advantages of the present invention will be apparent from the following description taken in conjunction with the accompanying drawings,

BRIEF DESCRIPTION OF THE DRAWINGS

DESCRIPTION OF THE PREFERRED EMBODIMENTS (a) Schematic structure of the invention FIG. 1A is a first schematic explanatory view of the structure of the present invention. The reference numeral 11 represents a communication apparatus for communicating between LANs, 12 a LAN interface portion, 13 an amount-of-data identifying portion for identifying the amount of data transmitted, $14_1$ to $14_n$ wide area network interface portions, and 15 a bandwidth control line monitor portion for determining the necessary band on the basis of the amount of data transmitted.

The communication apparatus 11 is provided with at least one LAN interface portion 12, a plurality of the wide area network interface portions $14_1$ to $14_n$, the amount-of-data identifying portion 13 for identifying the amount of data transmitted from the terminal of a LAN to the terminal at the other end, and the bandwidth control line monitor portion 15 for calculating the band which is necessary for communication between LANs on the basis of the amount of data.

The amount-of-data identifying portion (upper layer identifying portion) 13 identifies the amount of data which is contained in an upper layer (application layer) of the information transmitted from the terminal of the LAN, and the bandwidth control line monitor portion 15 calculates the necessary band on the basis of the amount of data and controls communication between LANs through the wide area network interface portions $14_1$ to $14_n$, the number of which is determined on the basis of the calculated band. In this way, the communication apparatus 11 identifies the amount of data which is contained in the information transmitted from the terminal of the LAN and can instantly determine the necessary band corresponding thereto. The communication apparatus 11 can communicate between LANs by using the number of lines corresponding to the band. In other words, the communication apparatus 11 can rapidly assigning an appropriate band and commence communication.

Figure 1A:
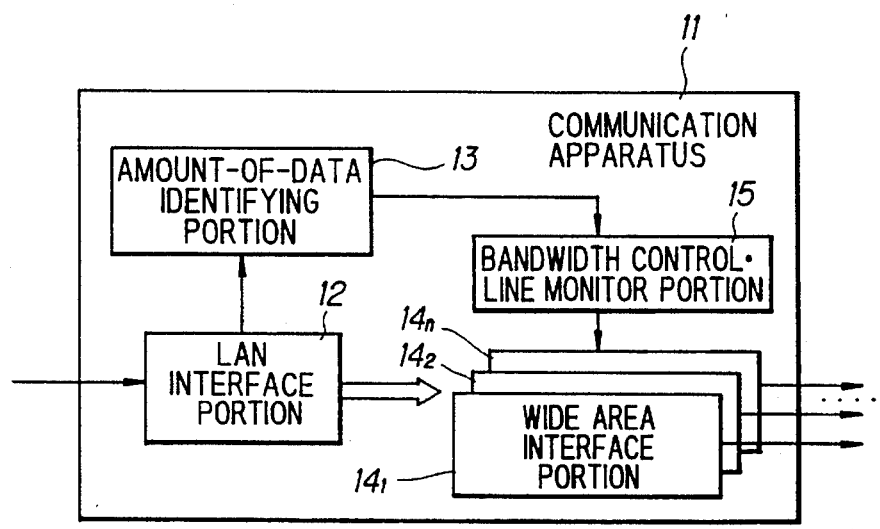
FIGS. 1A and 1B are schematic explanatory views of the structure of present invention.
Figure 1B:
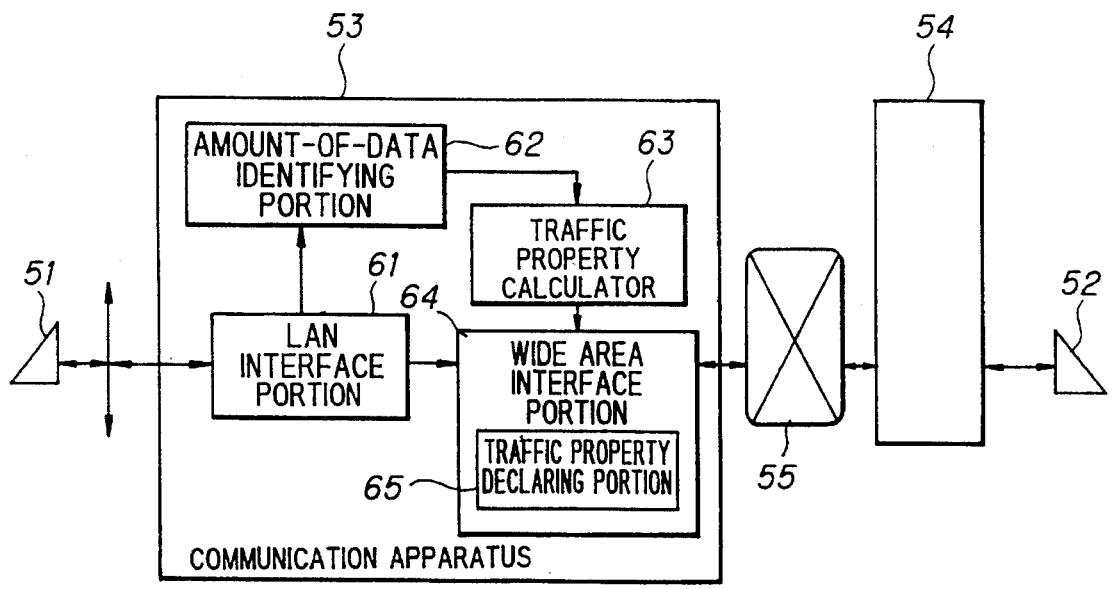

FIG. 1B is a second schematic explanatory view of the structure of the present invention. The reference numerals 51, 52 represent terminals of the LANs, 53, 54 denote communication apparatuses, 55 a wide area network, 61 a LAN interface portion, 62 is an amount-of-data identifying portion for identifying the amount of data transmitted, 63 is a traffic characteristics calculator for calculating the traffic characteristics on the basis of the amount of data transmitted, 64 is a wide area network interface portion, 65 is a traffic characteristics declaring portion provided in the wide area network so as to declare the calculated traffic characteristics to the network.

The wide area network 55 is configured so as to secure the band for communication in correspondence with the declared traffic characteristics (transfer speed, peak speed and average speed). The communication apparatus 53 connected to the wide area network 55 is provided with the LAN interface portion 61 serving as an interface between the terminal 51 and the communication apparatus 53. The wide area interface portion 64 serves as an interface between the wide area network 55 and the communication apparatus 53. The amount-of-data identifying portion 62 for identifies the amount of data transmitted to the terminal 52 at the other end from the information sent from the terminal 51. The traffic characteristics calculator 63 for calculates the traffic characteristics on the basis of the amount of data, and the traffic characteristics declaring portion 65 for declaring the calculated traffic characteristics.

The amount-of-data identifying portion (upper layer identifying portion) 62 identifies the amount of data by reference to a specific portion of the upper layer from the information transmitted from the terminal 51 of the LAN, the traffic characteristics calculator 63 calculates the traffic characteristics on the basis of the amount of data, the traffic characteristics declaring portion 65 declares the calculated traffic characteristics to the wide area network 55 through the wide area interface portion 64, and the wide area network 55 communicates on the basis of the declared traffic characteristics. The traffic characteristics declaring portion 65 also declares the traffic characteristics which are calculated similarly during communication to the wide area network 55 so as to change the traffic characteristics during communication. In this way, it is possible to declare the traffic characteristics corresponding to the amount of data transmitted and communicate on the basis of the declared traffic characteristics. In the case of communication of data having a high burst probability, it is possible to communicate the data with the traffic characteristics which correspond to the amount of data transmitted.

(b) First embodiment of the invention (b-1) Entire structure

Figure 2:
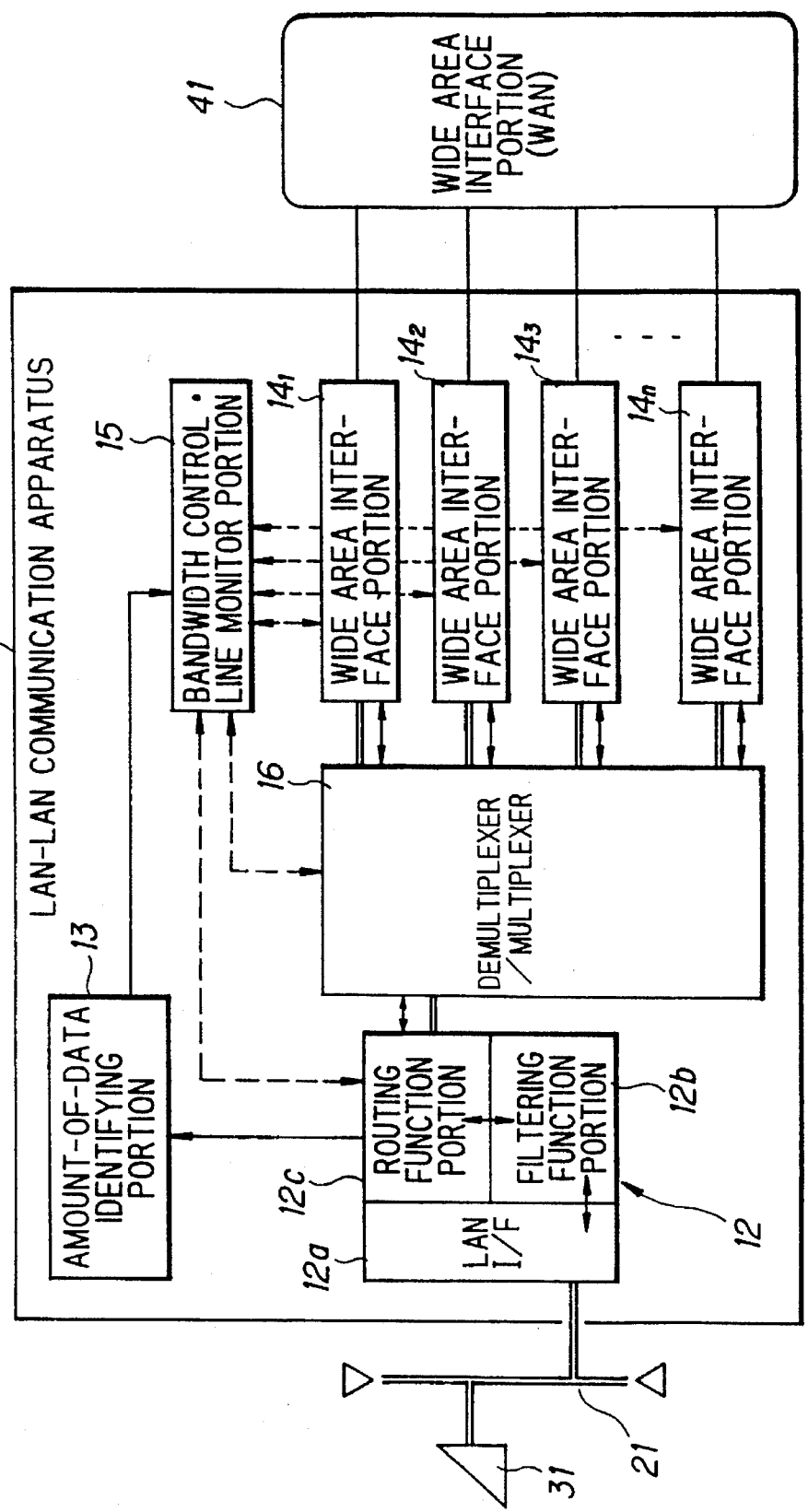
FIG. 2 shows the structure of a first embodiment of a LAN-LAN communication apparatus according to the present invention.

FIG. 2 shows the structure of a first embodiment of a LAN-LAN communication apparatus according to the present invention. In FIG. 2, the reference numeral 11 represents a LAN-LAN communication apparatus for controlling the connection and data transfer in the lower layers (physically layer, link layer and network layer) of an OSI reference model, 21 is an Ethernet as a LAN, 31 is a terminal such as a personal computer connected to the LAN, and 41 is a wide area network (public data network, packet network, leased line, etc.). In the LAN-LAN communication apparatus 11, the reference numeral 12 represents a LAN interface device accommodating the Ethernet 21, 13 is an amount-of-data identifying portion for identifying the amount of data transmitted which is contained in the information sent from the terminal 31 of the LAN, $14_1$ to $14_n$ are wide area network interface portions such as BRI (Basic Rate Interface) portions, 15 is a bandwidth control line monitor portion for determining the necessary band on the basis of the amount of data transmitted, and 16 is a demultiplexer/multiplexer.

In the embodiment shown in FIG. 2, the LAN communication apparatus 11 includes the amount-of-data identifying portion (upper layer identifying portion) 13 for identifying the amount of data transmitted by reference to a specific portion of an upper layer, e.g., an application layer, and the bandwidth control line monitor portion 15 determines the necessary band on the basis of the amount of data identified by the data identifying portion 13.

Figure 3:
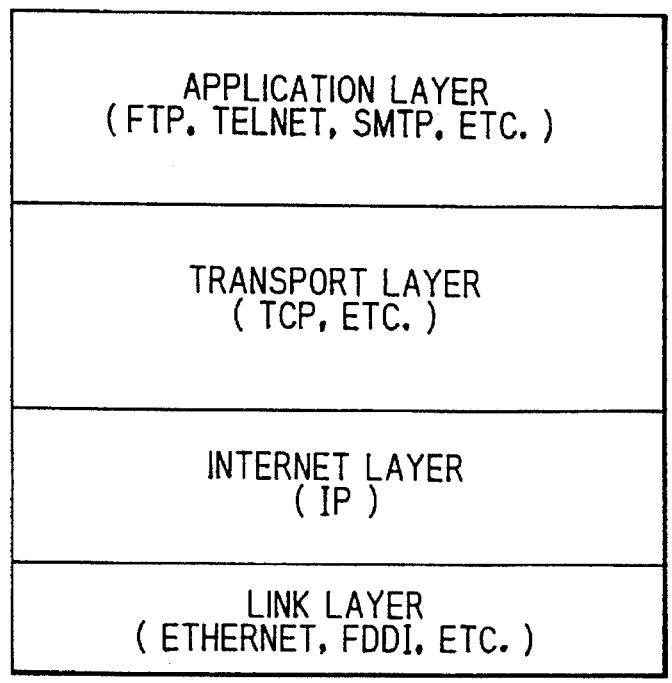
FIG. 3 is an explanatory view of the layer structure of an internet protocol.

FIG. 3 shows the layer structure of an internet protocol as a protocol between the networks. The internet protocol is composed of a link layer, an internet layer, a transport layer and an application layer.

The link layer is the one which takes the responsibility of data transfer with a high reliability between the adjacent nodes and executes processing which is different with the access technique of a transfer medium used in each local network in the internet system. For example, in a LAN, the link layer executes an access processing such as Ethernet, Token ring and FDDI (Fiber Distributed Data Interface).

The internet layer is the one which transmits a message from the originating party to the terminating party in cooperation with a relay node. As the protocol of the internet layer, an internet protocol IP is standardized. In the internet layer, various functions (e.g., routing and division and reconstruction of a message) which are necessary for transmitting a message are defined.

The transport layer is the one which provides a service for sending a message from a originating application process to a terminating application process. In this layer, transmission control protocol TCP for guaranteeing the high reliability of communication is standardized.

The application layer is one which provides a service for each user application. For example, the file transfer, remote logging, and electronic mail transfer functions are defined, and file transfer protocol FTP, TELNET protocol, simple mail transfer protocol SMTP are standardized for the respective functions.

Figure 4:
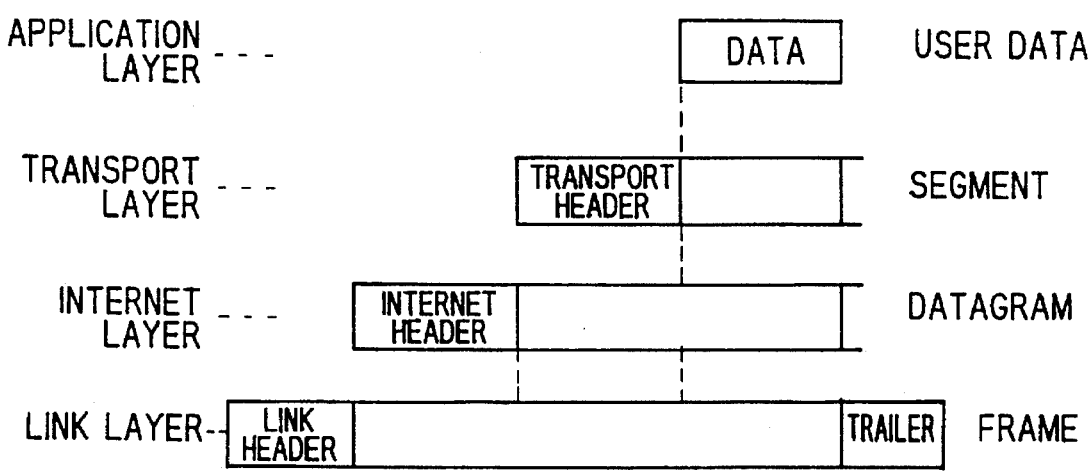
FIG. 4 shows the structure of a message in TCP/IP.

FIG. 4 shows the structure of a message in the TCP/IP. The data supplied from the application layer is formed into a segment with a transport header added thereto in the transport layer. In the internet layer, a header is added to the segment so as to constitute a datagram, and a header and a trailer are added to the datagram in the link layer so as to constitute a frame, which is supplied to the physical medium.

(b-2) LAN interface device

Figure 5:
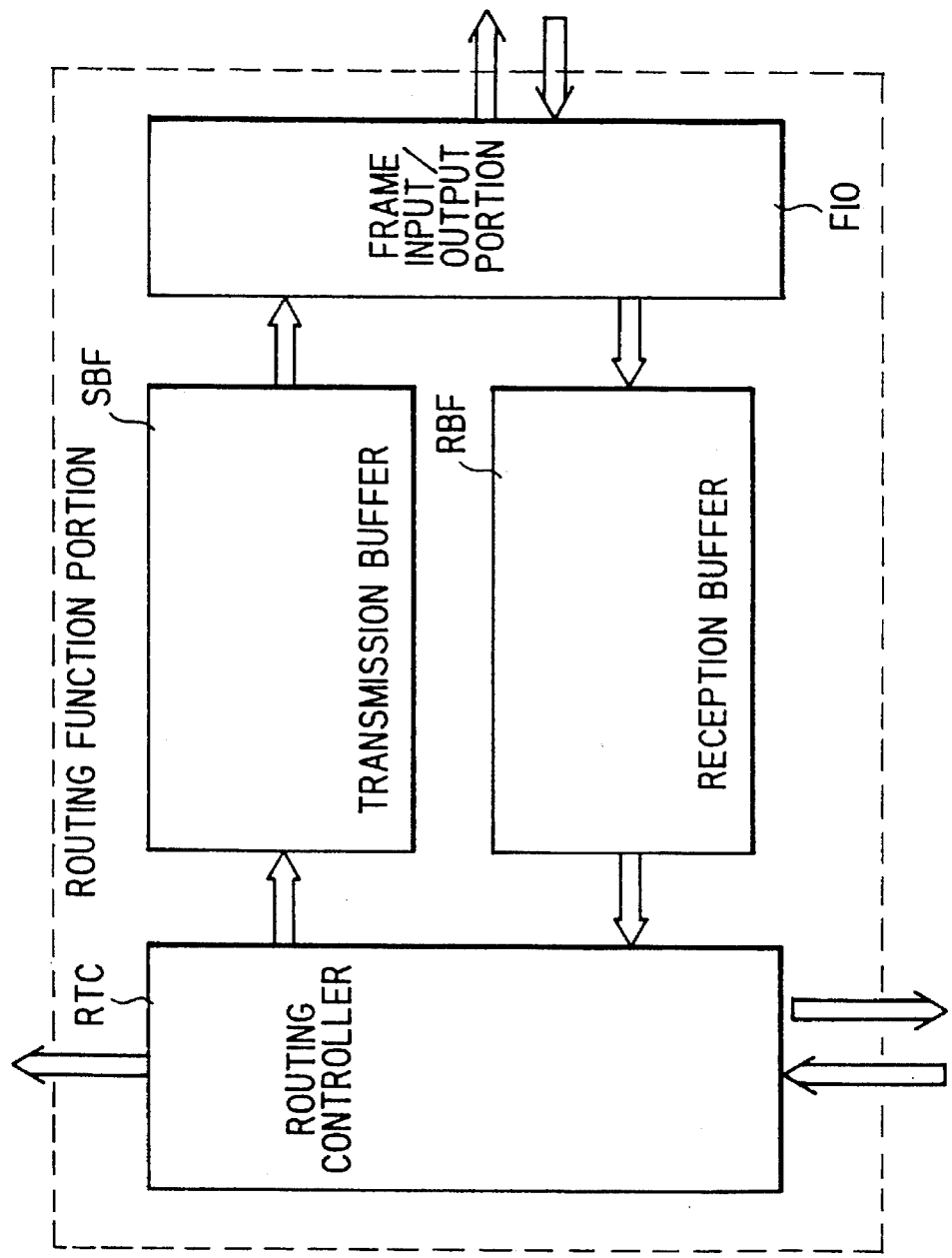
FIG. 5 shows the structure of a routine function portion.

Referring again to FIG. 2, in the LAN interface device 12, the reference numeral 12a represents a LAN interface portion which is connected to the LAN, 12b is a filtering function portion for taking in frames which need to be transferred through the wide area network (WAN) 41, and 12c is a routing function portion which stores the frames taken in by the filtering function into a buffer provided in the routing function portion 12c, and serially reads and outputs the frames from the buffer. The routing function portion 12b is provided with a routing controller RTC, a transmission buffer SBF for temporarily storing a frame transmitted, a reception buffer RBF for temporarily storing a received frame, and a frame input/output portion FIO, as shown in FIG. 5.

(b-3) Amount-of-data identifying portion

Prior to data transmission, negotiation between the transmission side and the reception side is conducted in an upper layer (application layer). The negotiation information is also input to the amount-of-data identifying portion 13 through the LAN interface device 12. Since the negotiation information contains the information showing the amount of data transmitted, the amount-of-data identifying portion 13 identifies the amount of data transmitted from the latter information.

Figure 6:
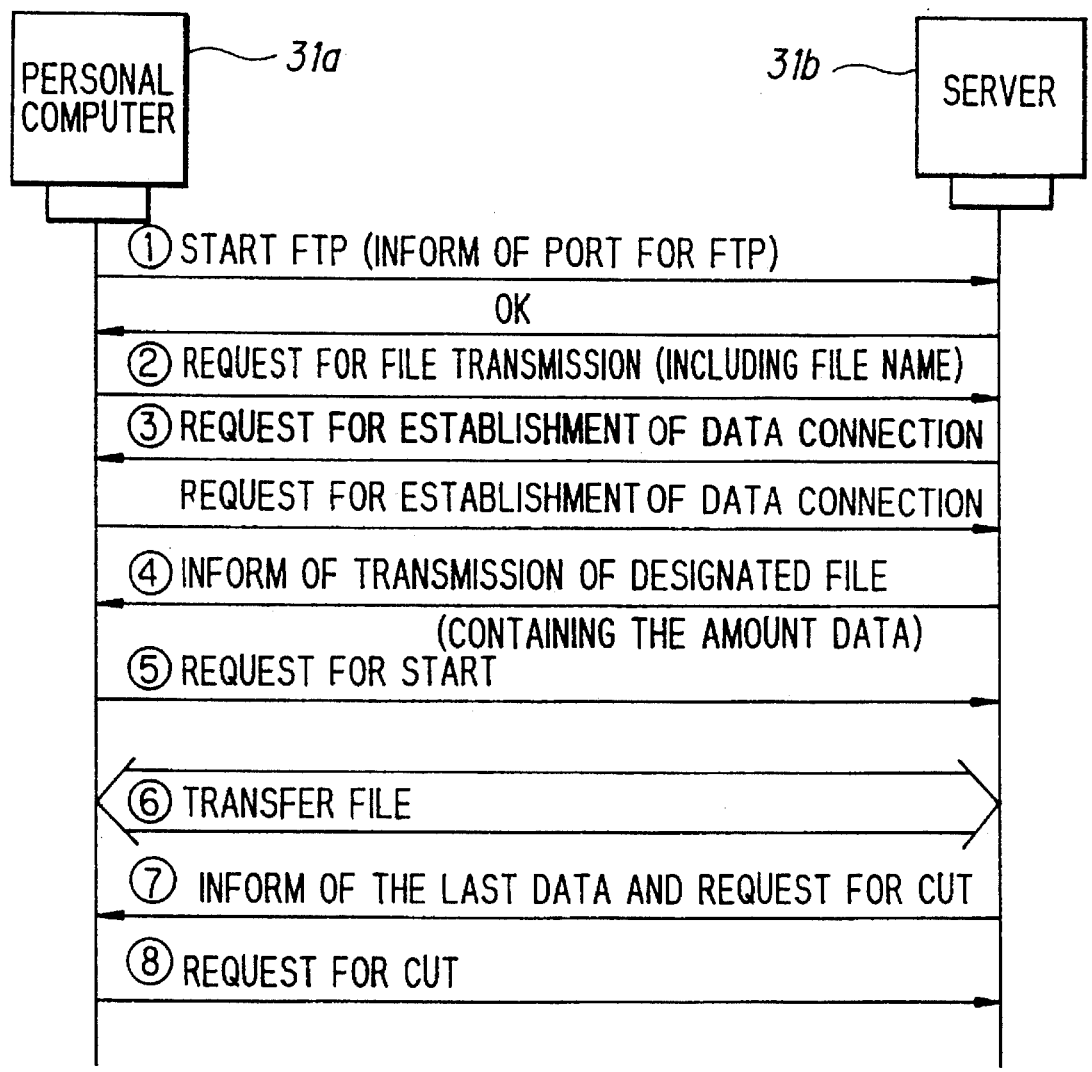
FIG. 6 is an explanatory view of an FTP procedure.

FIG. 6 is an explanatory view of a file transfer procedure in accordance with the file transfer protocol FTP in the TCP/IP. The reference numeral 31a denotes a personal computer and 31b is a server.

① The FTP is started by informing the port number for the FTP from the personal computer 31a to the server 31b.

② When the server 31b receives the start command and supplies a start OK message to the personal computer 31a, the personal computer 31a transmits a request for file transmission (including a file name) to the server 31b.

③ Thereafter, a request for the establishment of a data connection is transmitted and received between the server 31b and the personal computer 31a, thereby establishing data connection.

④ When the data connection is established, the server 31b informs the personal computer 31a of the transmission of the designated file, which contains the amount of data transmitted.

⑤ When the personal computer 31a receives the information on the transmission, the personal computer 31a supplies a request for start to the server 31b.

⑥ Thereafter, the file is transmitted from the server 31b to the personal computer 31a.

⑦ When the data is the last data, the server 31b informs the personal computer 31a that the data is the last data and supplies a request for a cut off to the personal computer 31a.

⑧ After the personal computer 31a receives the last data, it supplies a request for the cut off to the server 31b, thereby finishing the file transfer process.

The above-described file transfer process is applicable to a case in which files are transmitted from the server 31b, and a similar procedure is taken when files are transmitted to the server 31b.

Such a file transfer procedure is executed in communication between LANs. For this reason, the amount-of-data identifying portion 13 identifies the amount of data transmitted which is contained in the information supplied from the terminal of the LAN in the negotiation between file transfers.

(b-4) Bandwidth control line monitor portion

The bandwidth control line monitor portion 15 shown in FIG. 2 determines the necessary band on the basis of the amount of data which is input from the amount-of-data identifying portion 13 at the time when a request for data transfer generates, and controls communication between the LANs. The communication is executed by the number of the wide area interface portions $14_1$ to $14_n$ which is determined on the basis of the band. The necessary band is obtained from the traffic density, and if an excess band is assigning ed, the line is released.

Figure 7:
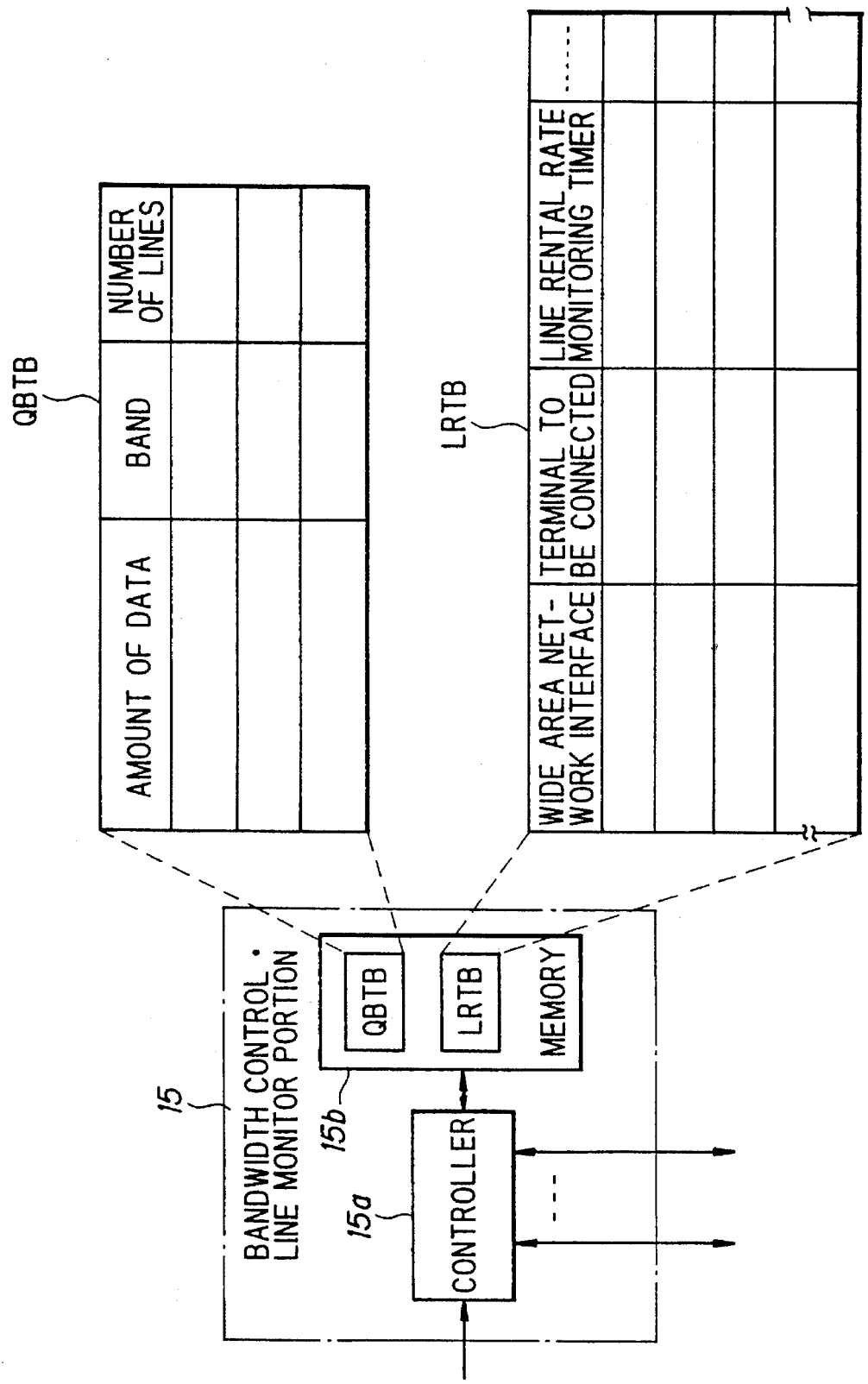
FIG. 7 shows the structure of a bandwidth control/line monitor portion.

FIG. 7 shows the structure of the bandwidth control line monitor portion. The bandwidth control line monitor portion 15 is provided with a controller 15a for controlling the bandwidth and the line, and a memory 15b for storing various tables QBTB and LRTB. The bandwidth table QBTB stores the correspondence between the amount of data transmitted, necessary band and the number of lines, and the line resource control table LRTB stores the terminating party, the line-tariff monitoring timer in correspondence with the wide area network interface portions $14_1$, $14_2$, ... $14_n$. By referring to the terminating party to which the corresponding one of the wide area network interface portions $14_1$ to $14_n$ is connected, it is possible to specify the line and the number of lines used for a predetermined LAN-LAN communication. If the line user's fee is added up every three minutes, for example, the line-tariff monitoring timer will count the number of times (M) three minutes has elapsed as well as a length of time (m) up to three minutes. The timers are always updated at the time of connection.

(b-5) Demultiplexer/multiplexer

Figure 8:
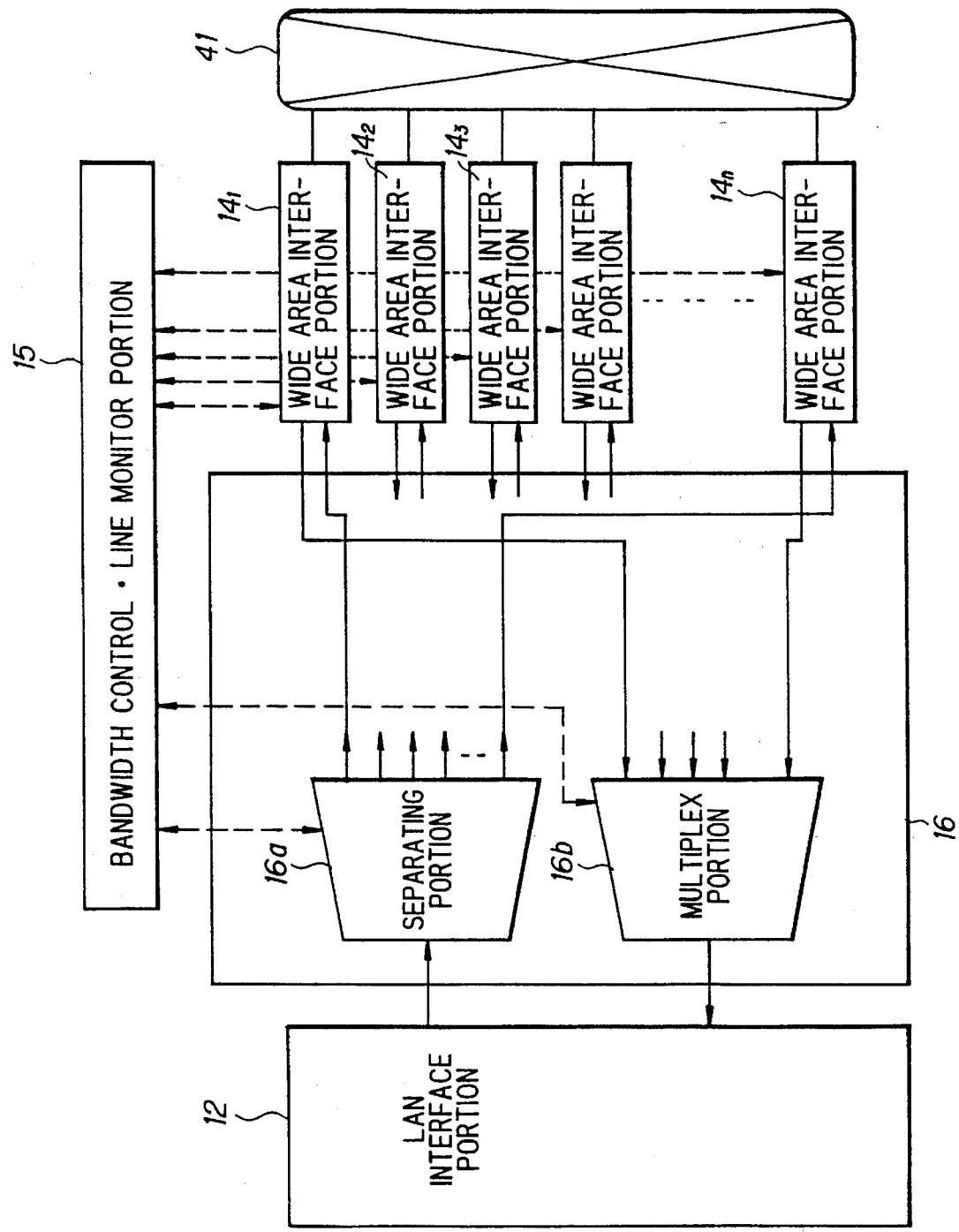
FIG. 8 shows a demultiplexer/multiplexer.

The demultiplexer/multiplexer 16 shown in FIG. 2 demultiplexes the series of frames that enter from the LAN interface device 12 and output the demultiplexed frames on a plurality of lines, and multiplexes the frames input from the WAN through each line and send these frames to the LAN interface device 12. FIG. 8 shows the structure of the demultiplexer/multiplexer 16 and the peripheral equipments thereof. In the demultiplexer/multiplexer 16, the reference numeral 16a denotes a demultiplexer for demultiplexing, frame by frame, the data that enters from the LAN interface device 12 into data on a plurality of lines (the smallest unit of information) and supplying the separated data, and 16b is a multiplexer for multiplexing the frames input through the corresponding lines and sending the multiplexed frames to the LAN interface device 12. The demultiplexer 16a demultiplexes, frame by frame, the data and outputs the demultiplexed data to the plurality of wide area network interface portions $14_1$ to $14_n$ designated by the bandwidth control line monitor portion 15. The multiplexer 16b multiplexes the frames input from the plurality of wide area network interface portions $14_1$ to $14_n$ designated by the bandwidth control line monitor portion 15 and outputs it to the LAN interface device 12.

The LAN-LAN communication system in accordance with the present invention will be explained below.

(b-6) Bandwidth control

Figure 9:
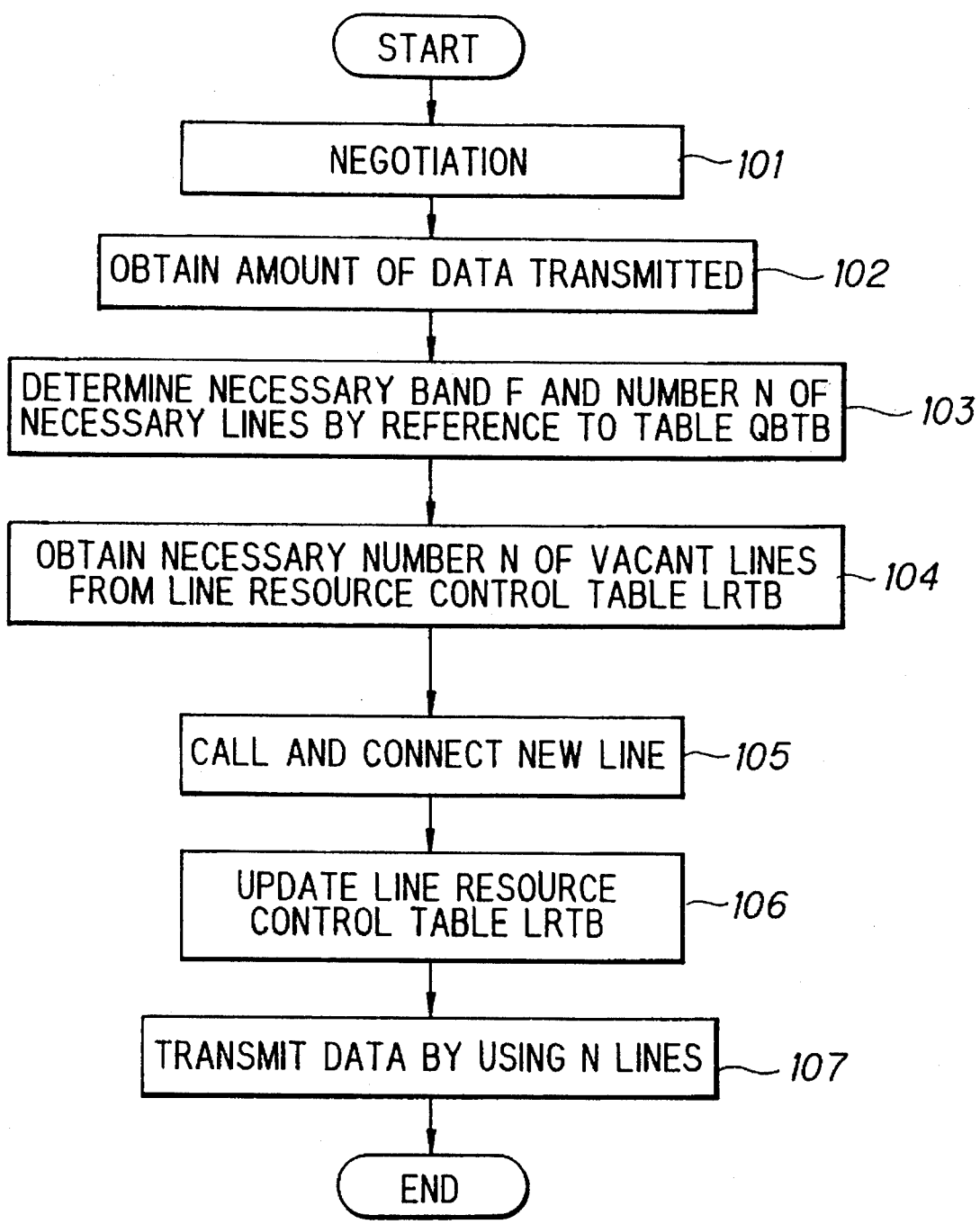
FIG. 9 is a flowchart of a bandwidth control process at the time of transferring a file.

FIG. 9 is a flowchart of a bandwidth control process at the time of transferring a file. It is assumed here that the file transfer protocol is an FTP in the TCP/IP, and that a file is transferred to the terminal of the LAN at the other end from the terminal 31 of the LAN in a LAN-WAN-LAN connection.

In the case of communicating data from the terminal 31 by using the FTP, negotiation is executed between the originating terminals and the terminating terminal by the FTP control frame prior to file transfer (step 101) The information supplied from the terminal 31 during negotiation is also input to the amount-of-data identifying portion 13. The amount-of-data identifying portion identifies the amount of data transmitted contained in the negotiation information and inputs the amount of data to the bandwidth control line monitor portion 15 (step 102).

The bandwidth control line monitor portion 15 obtains the band F corresponding to the amount of data transmitted from the bandwidth table QBTB and stores the band F, and also determines the number n of necessary lines considering the band F and the band (transfer speed) for one line (step 103). For example, if the necessary band is 256 Kbps, two wide area network interface portions (BRI interfaces) are used. If the number of lines are registered in the table QBTB, they are used as they are.

The bandwidth control line monitor portion 15 then obtains n vacant lines (wide area interface portions) by reference to the line resource control table LRTB, and supplies an enable signal to the wide area interface portions (step 104). Each wide area network interface portion which has received the enable signal executes a calling process and a connecting process (step 105). When all of the n lines are connected so that data transmission is possible, the bandwidth control line monitor portion 15 writes the connected terminal in the corresponding one of the n wide area network interface portions in the line resource control table LRTB, and starts each line-tariff monitoring timer (step 106).

The bandwidth control line monitor portion 15 also informs the demultiplexer 16a of the demultiplexer/multiplexer 16 of the n wide area network interface portions to which the demultiplexed data is to be transmitted. The demultiplexer 16a then demultiplexes the data input from the LAN interface device 12 into n items of data and sends n items of data to the wide area network 41 through the corresponding one of the n wide area network interface portions.

(b-7) Line release process

Figure 10:
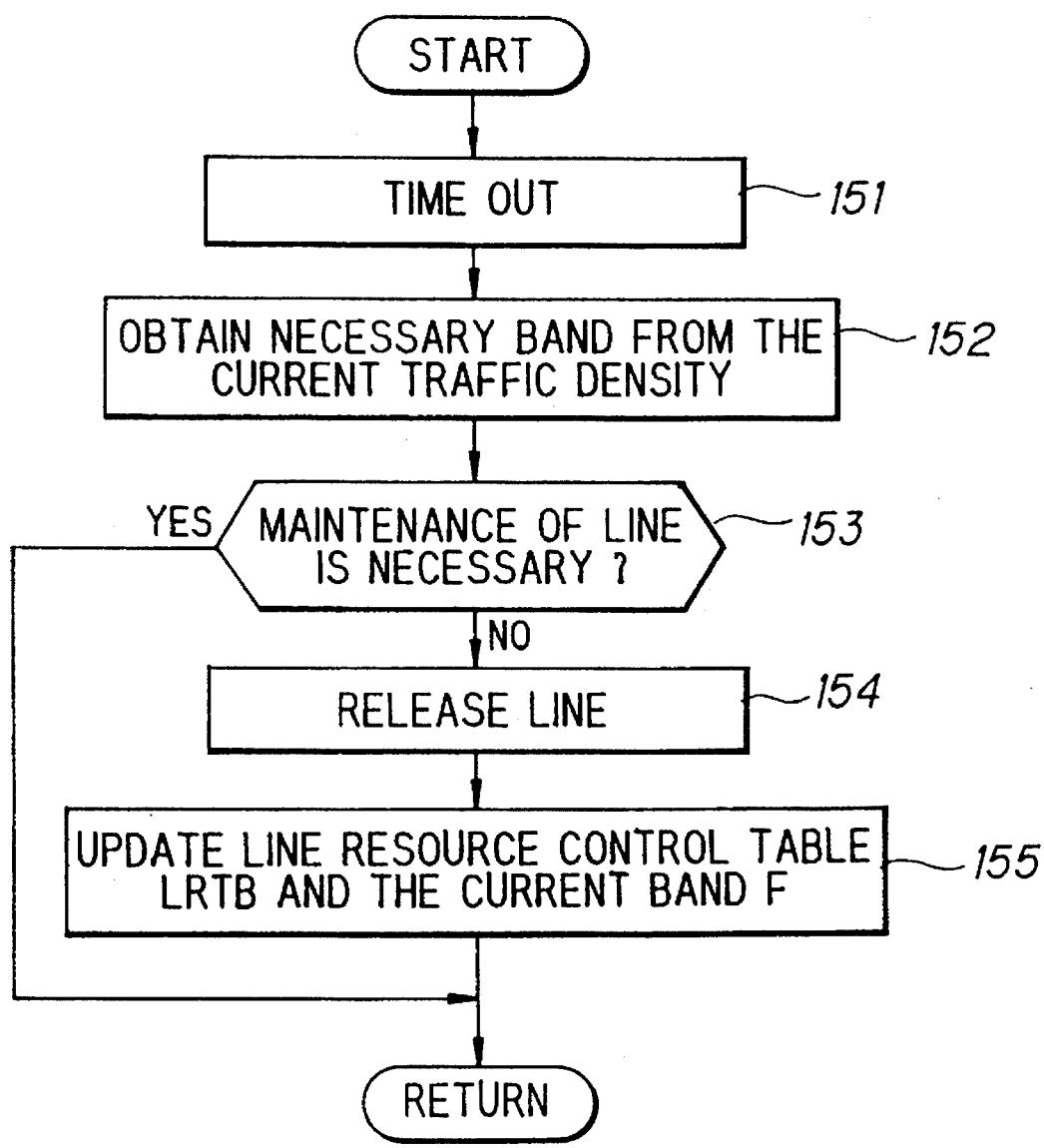
FIG. 10 is a flowchart of a line releasing process.

FIG. 10 is a flowchart of a line release process.

The bandwidth control line monitor portion 15 has a line-tariff monitoring timer for each wide area network interface portion (see FIG. 7), so as to monitor the time elapsed for use of the line. The line-tariff monitoring timer holds the number M of times three minutes elapsed as well as the length of the time m up to three minutes if the line user's fee is added up every 3 minutes.

The bandwidth control line monitor portion 15 issues a TIME OUT message at a predetermined time before time m becomes 3 minutes (step 151). When the TIME OUT message is issued, the bandwidth control line monitor portion 15 obtains actual traffic density between the LAN and the connected LAN and obtains the necessary band f from the traffic density (step 152). The traffic density is obtained, for example, on the basis of the time during which data remains in the transmission buffer SBF (FIG. 5).

The necessary band f obtained on the basis of the traffic density is then compared with the current band F so as to judge whether or not the present line is to be maintained (step 153). If the current band F is appropriate, the line is maintained and the bandwidth control line monitor portion 15 waits the next predetermined time before the time m becomes 3 minutes.

On the other hand, if the traffic density is low and an excess band F is assigning ed, the bandwidth control line monitor portion 15 releases an unnecessary line (step 154), and updates the line resource control table LRTB and the band F (step 155). The process returns to the start and the bandwidth control line monitor portion 15 monitors the next TIME OUT.

The first embodiment described above which is applied to an OSI reference model will be explained below. The communication apparatus 11 having at least one LAN interface portion 12, and a plurality of the wide area network interface portions $14_1$ to $14_n$ is provided with the upper layer identifying portion (the amount-of-data identifying portion) 13 and the bandwidth control line monitor portion 15. In the lower layers (the layers below the network layer of the OSI reference model), the LANs and the WAN are connected, and LAN data are transmitted to the WAN. In this case, the upper layer identifying portion 13 identifies the amount of data transmitted by referring only to a specific portion of the upper layers (the layers above the network layer of the OSI reference model), and the bandwidth control line monitor portion 15 determines the necessary band on the basis of the amount of data transmitted and sends the LAN data to the WAN by using the number of wide area interfaces which corresponds to the necessary band.

According to the first embodiment, it is possible to secure an appropriate band in correspondence with the amount of data transmitted. In addition, since the band is secured before the data transfer, communication is not stopped during the data transfer, thereby enhancing the reliability and realizing the reduction of the transfer time.

(c) Second embodiment of the invention (c-1) Entire structure

Figure 11:
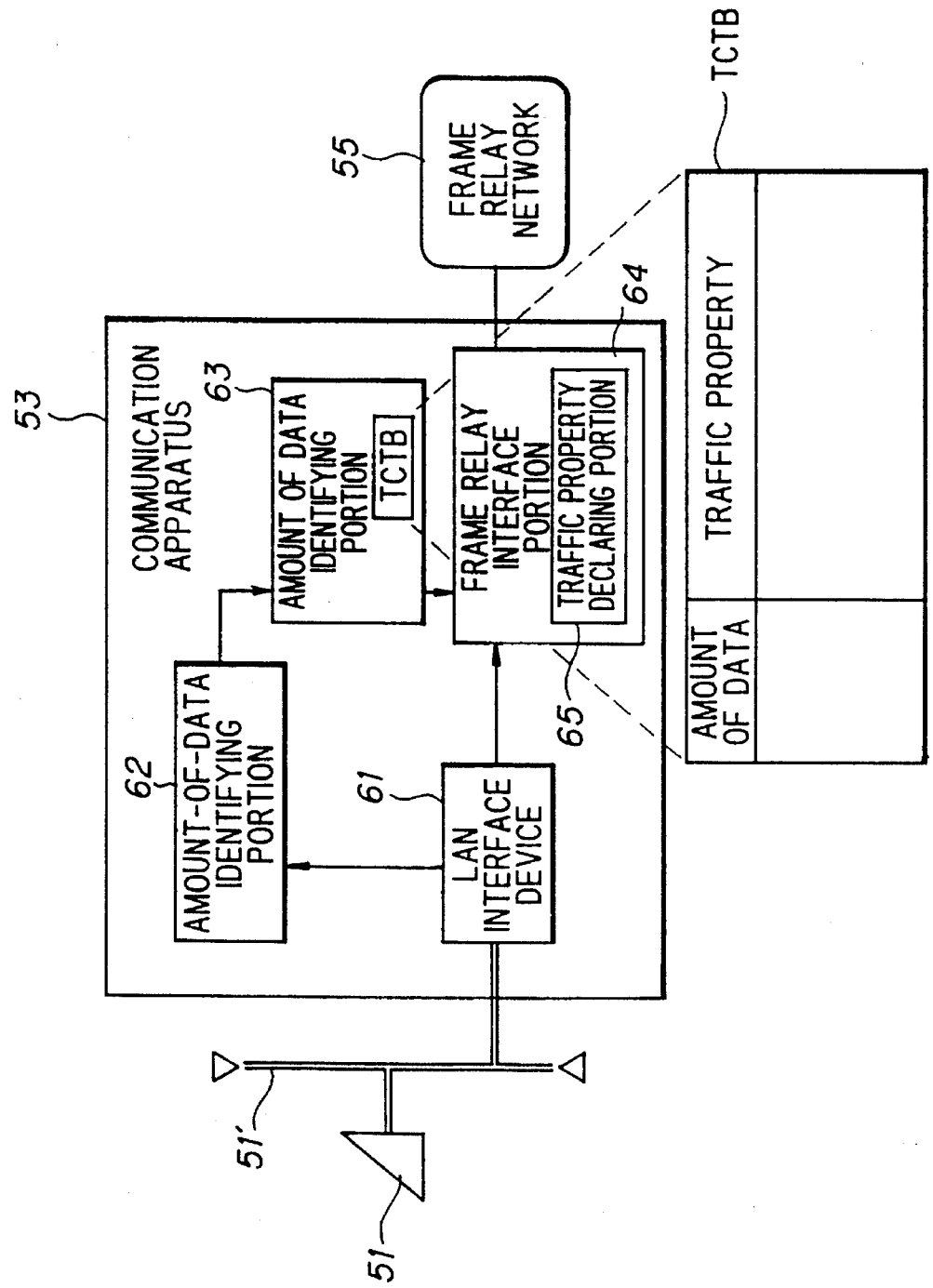
FIG. 11 shows the structure of a second embodiment of a LAN-LAN communication apparatus according to the present invention.

FIG. 11 shows the structure of a second embodiment of the present invention. In this embodiment, appropriate traffic characteristics are calculated on the basis of the amount of data transmitted and declared to the network, and the network communicates on the basis of the declared value.

In FIG. 11, the reference numeral 51 represents the terminal of a LAN, 51' is an Ethernet (LAN), 53 is a communication apparatus connecting the terminal 51 of the LAN and a wide area network, and 55 is the wide area network (WAN) such as a frame relay network. In the communication apparatus 53, the reference numeral 61 represents a LAN interface device having a structure shown in FIGS. 2 and 5, 62 is an amount-of-data identifying apparatus for identifying the amount of data transmitted, 63 is a traffic characteristics calculator for calculating the traffic characteristics on the basis of the amount of data transmitted, 64 is a wide area network interface portion such as a frame relay interface portion, and 65 is a traffic characteristics declaring portion for declaring the calculated traffic characteristics to the network 55. In the traffic characteristics calculator 63, a table TCTB is set in advance, which indicates the correspondence between the amount of data transmitted and appropriate traffic characteristics (transfer speed (band), peak speed, average speed, etc.).

The terminal 51 of the LAN transfers a file in accordance with the file transfer protocol FTP in the TCP/IP. In the file transfer protocol FTP, negotiation is conducted between the originating terminal and the terminating terminal prior to data transfer. Since the negotiation information contains the information indicating the amount of data to be transmitted, the amount-of-data identifying portion 62 identifies the amount of data transmitted from the latter information.

(c-2) Schematic operation

In a frame relay communication, ATM communication or the like, the amount-of-data identifying portion 62 identifies the amount of data transmitted to the LAN at the other end from the information which is supplied from the terminal 51 through the LAN interface device 61. The traffic characteristics calculator 63 calculates the traffic characteristics on the basis of the amount of data, and the traffic characteristics declaring portion 65 declares the calculated traffic characteristics to the frame relay network 55 through the frame relay interface portion 64. The frame relay network 55 communicates on the basis of the declared traffic characteristics.

The traffic characteristics calculator 63 also calculates the traffic characteristics on the basis of the amount of data during communication and declares the calculated traffic characteristics to the network 55 through the frame relay interface portion 64 so as to change the traffic characteristics during communication.

According to this structure, the communication apparatus 53 can declare the traffic characteristics corresponding to the amount of data transmitted, and communicate on the basis of the traffic characteristics. Especially, at the time of communicating data having a high burst probability, the communication apparatus 53 can communicate data with the traffic characteristics which correspond to the amount of data transmitted.

(c-3) Traffic characteristics control

Communication control in the case of calculating the traffic characteristics and declaring the calculated traffic characteristics before communication will now be explained.

Figure 12:
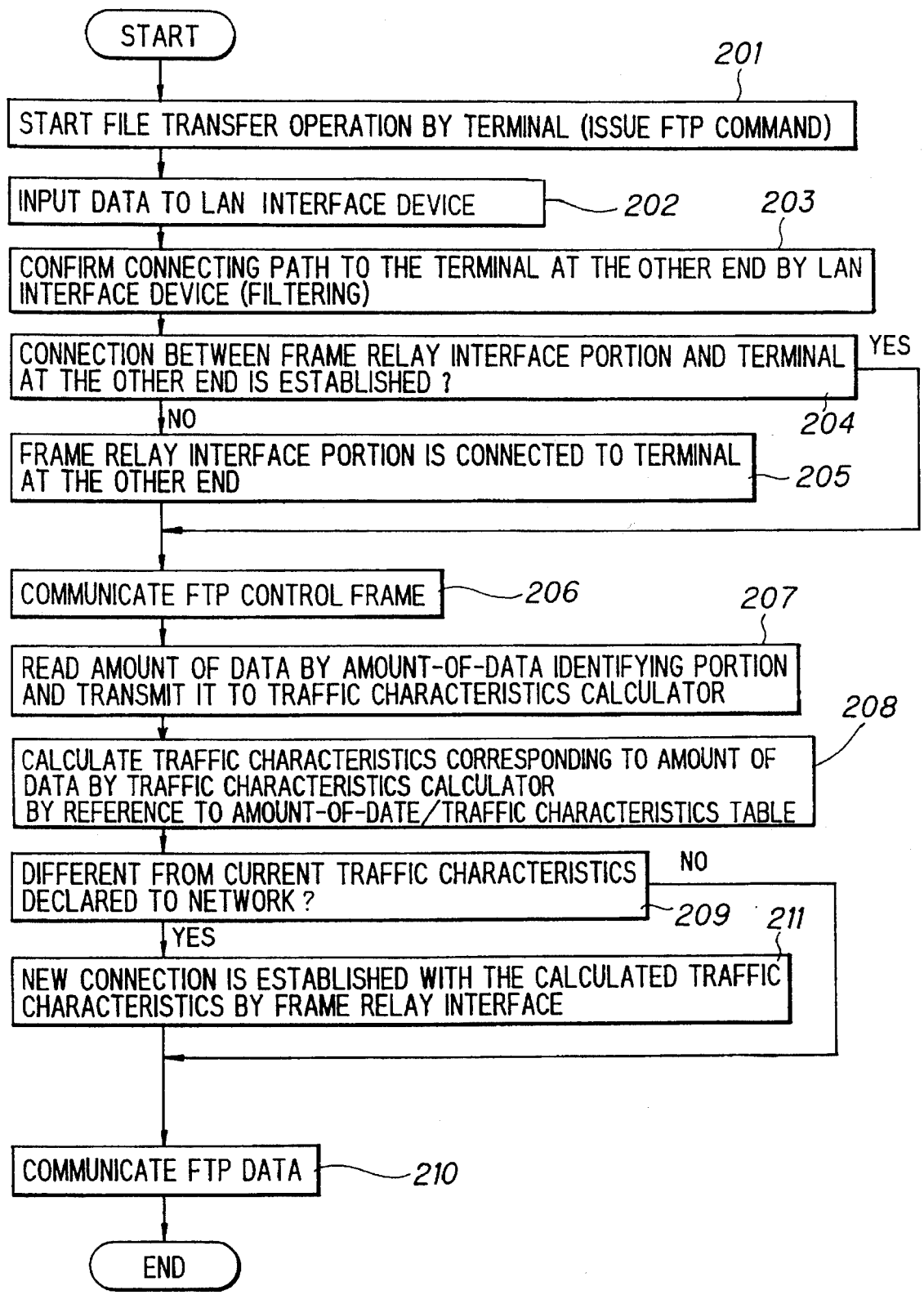
FIG. 12 is a flowchart of a traffic characteristics control process.

(1) In the case of having no device for changing the traffic characteristics during data communication FIG. 12 is a flowchart of a communication control process in the case of having no device for changing the traffic characteristics during data communication.

In the case of transferring a file, the file transferring operation is first started by the terminal 51 of the LAN (issue a command "FTP", step 201), and data are input to the LAN interface device 61 (step 202). LAN interface device 61 confirms the connecting path to the terminal at the other end which is included in the data (filtering, step 203). If the data are judged to be dealt with by the LAN interface device 61 by reference to the connecting path, the LAN interface device 61 inputs the data to the frame relay interface portion 64. The frame relay interface portion 64 judges whether or not a connection to the terminal at the other end is established (step 204). If the connection is not established, the frame relay interface portion 64 establishes the connection. In this case, the frame relay interface portion 64 declares the value set in advance for a control frame as the traffic characteristics (step 205).

If the connection is established, the terminal 51 communicates an FTP control frame (step 206). The amount-of-data identifying portion 62 reads the amount of transmitted data which is contained in the control frame, and transmits the amount of data to the traffic characteristics calculator 63 (step 207). The traffic characteristics calculator 63 calculates the traffic characteristics corresponding to the amount of data transmitted by reference to the table TCTB (step 208).

The traffic characteristics declaring portion 65 then judges whether or not the calculated traffic characteristics are different from the current traffic characteristics declared to the network 55 (step 209), and if they are the same, the data of the FTP are communicated with the traffic characteristics (step 210).

On the other hand, if the traffic characteristics are different, the traffic characteristics declaring portion 65 sends information message INFO with the calculated traffic characteristics added thereto to the network 55 and declares the calculated traffic characteristics. The network 55 establishes a new connection on the basis of the declared traffic characteristics (step 211), and thereafter communicates data with the new traffic characteristics and the new connection (step 210).

Figure 13:
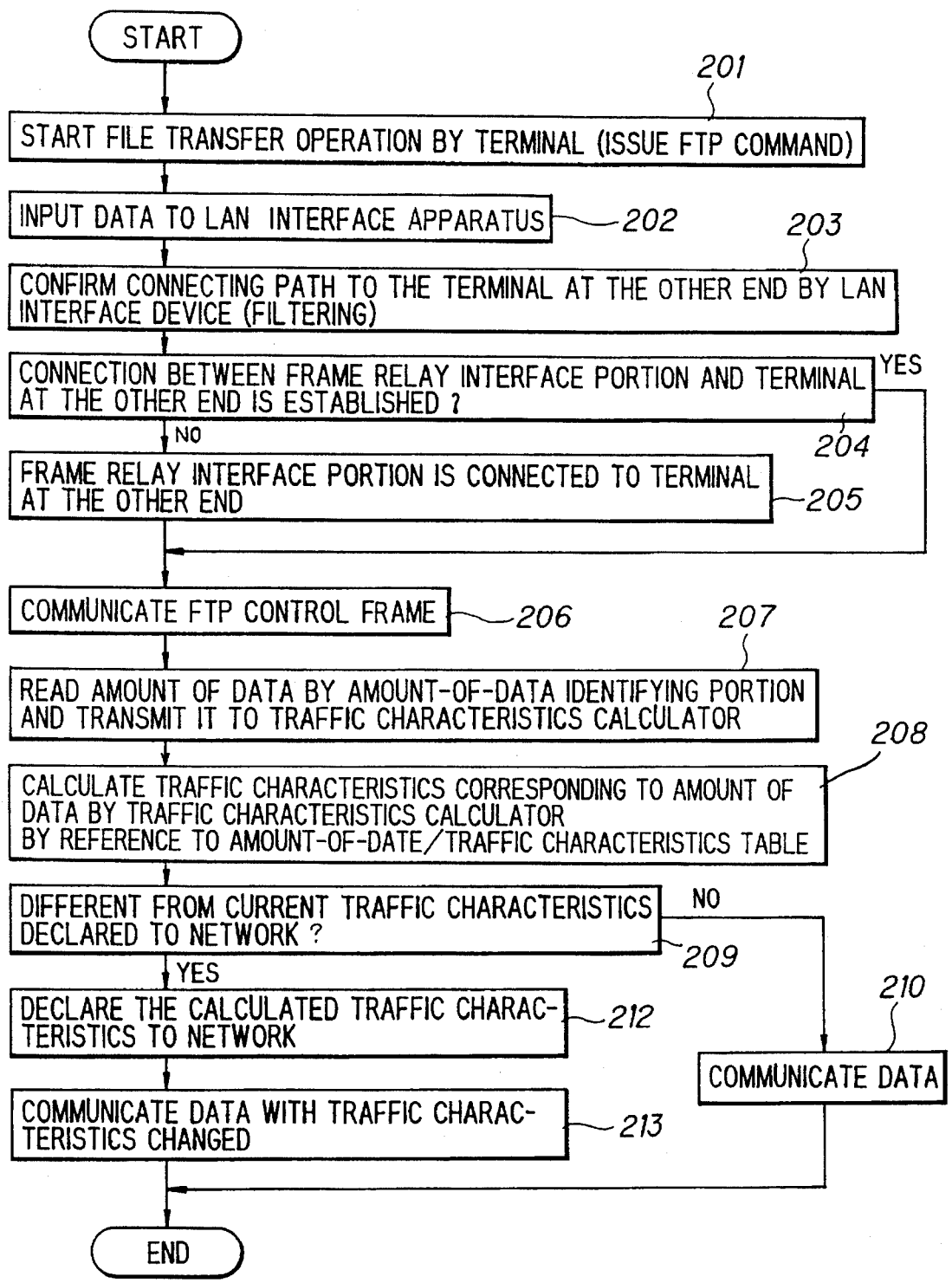
FIG. 13 is a flowchart of another traffic characteristics control process.

(2) In the case of having a device for changing the traffic characteristics during data communication the operation is as follows:

FIG. 13 is a flowchart of a communication control process in the case of having a device for changing the traffic characteristics during data communication. The flowchart in FIG. 13 is different from that in FIG. 12 in that when the calculated traffic characteristics are different from the current traffic characteristics declared to the network, communication is continued with the traffic characteristics changed but with the same connection.

To state this more concretely, when the calculated traffic characteristics are different from the current traffic characteristics declared to the network 55 (step 209), the traffic characteristics declaring portion 65 sends the information message INFO with the calculated traffic characteristics added thereto to the network 55 and declares the calculated traffic characteristics (step 212). The network 55 continues communication with the newly declared traffic characteristics (step 213).

Figure 14:
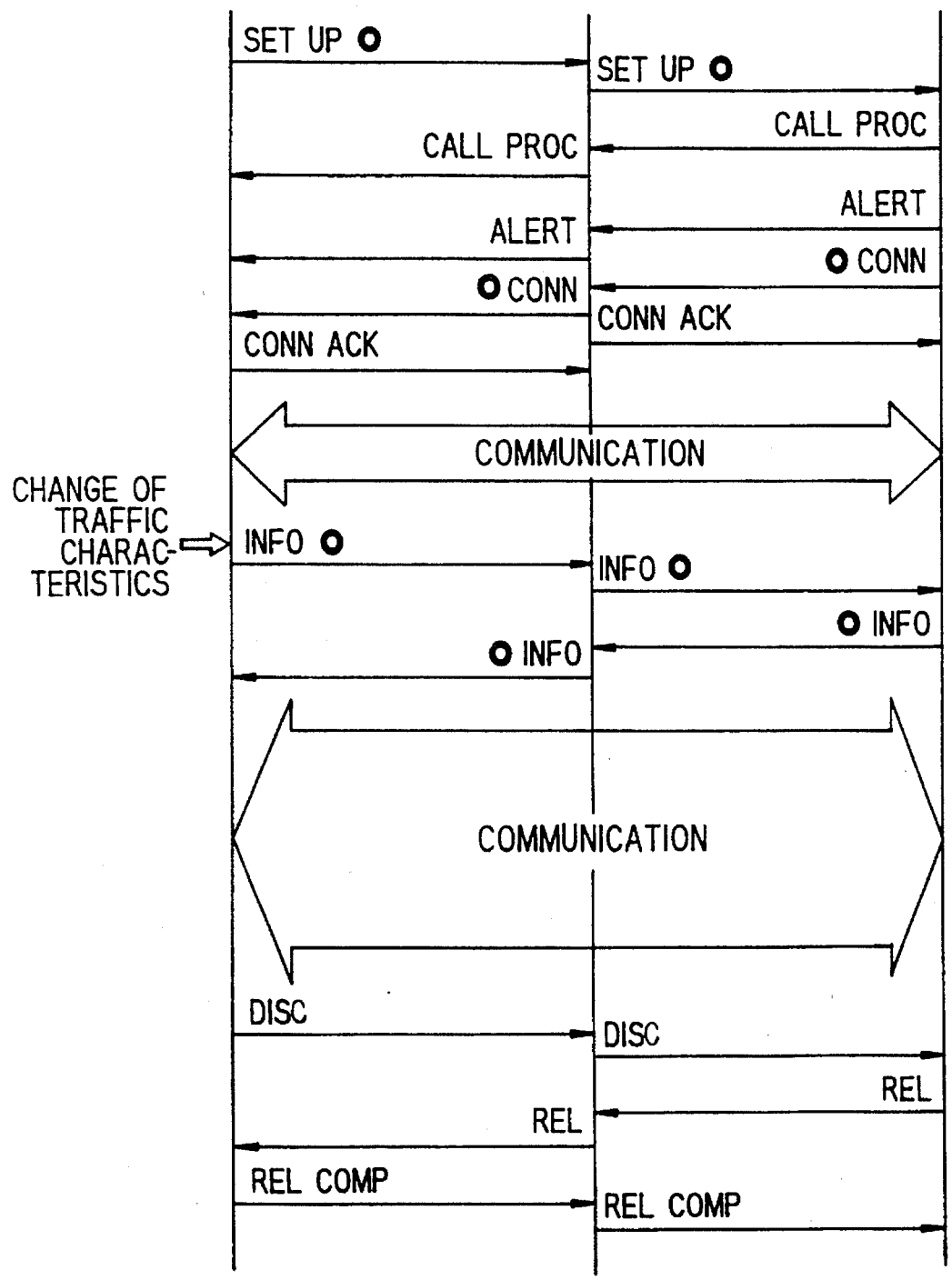
FIG. 14 is an explanatory view of a control procedure between the network and the user for communicating with new traffic characteristics.

FIG. 14 is an explanatory view of a procedure between the network and the user in the case of sending the information message with new traffic characteristics added thereto to the network during communication and continuing the communication with the new traffic characteristics. If additional information message INFO is transmitted from the originating terminal during communication, the network transmits the message to the terminating terminal so as to inform it of a change of the traffic characteristics. When the terminating terminal receives the message of a change of the traffic characteristics, the terminating terminal returns the additional message INFO so as to indicate that the reception is OK. The network transmits the message to the originating terminal and thereafter changes the traffic characteristics. Data are thereafter communicated with the declared traffic characteristics.

The second embodiment described above which is applied to an OSI reference model will be explained hereinafter. The communication apparatus 53 having at least one LAN interface portion 61 and the wide area network interface portions 64 is provided with the upper layer identifying portion (the amount-of-data identifying portion) 62, the traffic characteristics calculator 63 and the traffic characteristics declaring portion 65. In the lower layers (the layers below the network layer of the OSI reference model) of the communication apparatus 53, the terminals and the WAN are connected, and LAN data from the terminal are transmitted to the WAN. In this case where the upper layer identifying portion 62 identifies the amount of data transmitted by referring only to a specific portion of the upper layers (the layers above the network layer of the OSI reference model), the traffic characteristics calculator 63 calculates the traffic characteristics on the basis of the amount of data transmitted, and the traffic characteristics declaring portion sends the information message INFO to the network 53 so as to declare it. The network 53 secures the band in correspondence with the transmitted traffic characteristics and communicates.

As described above, the communication apparatus 53 can declare the traffic characteristics which correspond to the amount of data transmitted and communicate data on the basis of the declared traffic characteristics. Especially, in the case of communication of data having a high burst probability, data communication with the traffic characteristics corresponding to the amount of data transmitted is possible.

Figure 15:
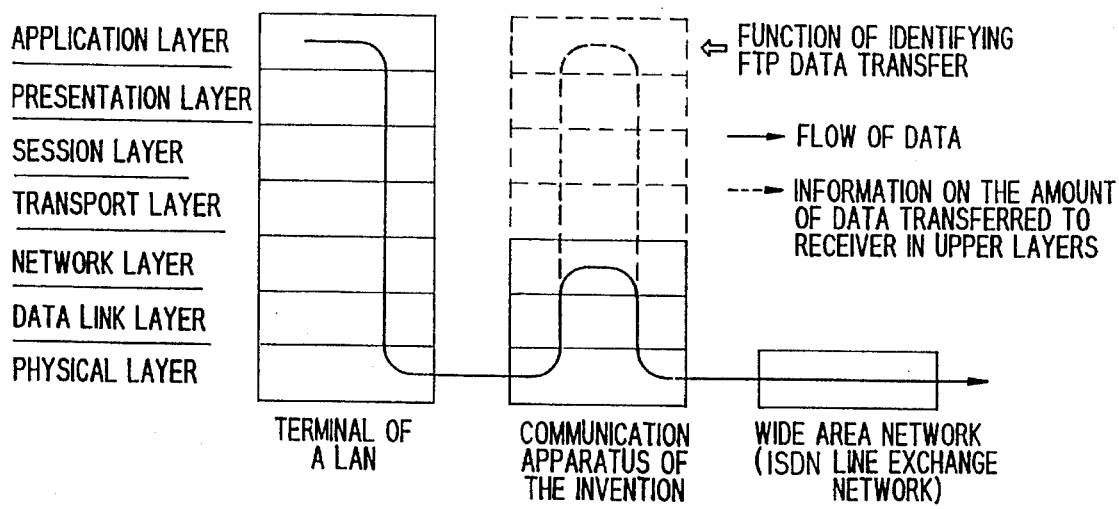
FIG. 15 is an explanatory view of the flow of the data in an OSI model of the present invention.
Figure 16:
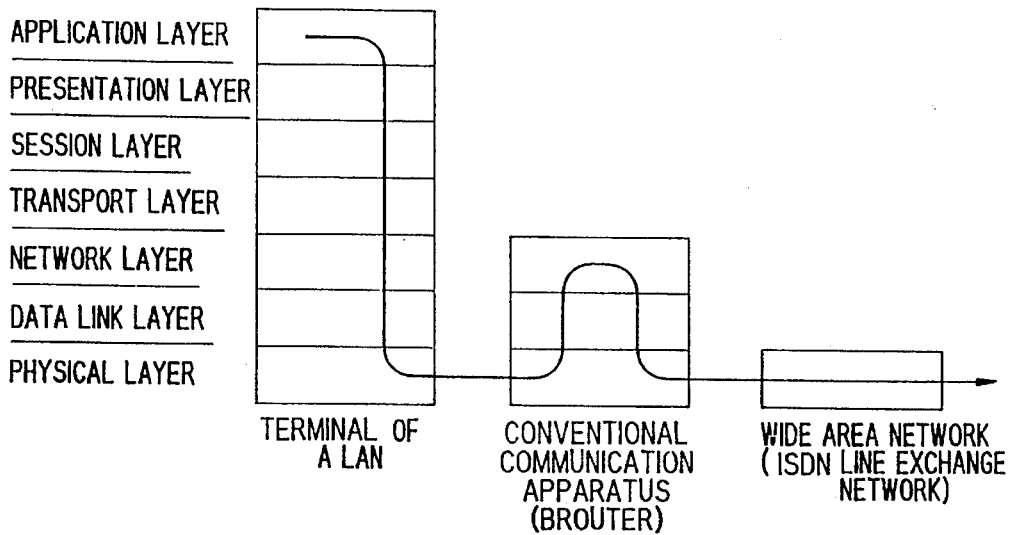
FIG. 16 is an explanatory view of the flow of the data in an OSI model of the related art.
Figure 17:
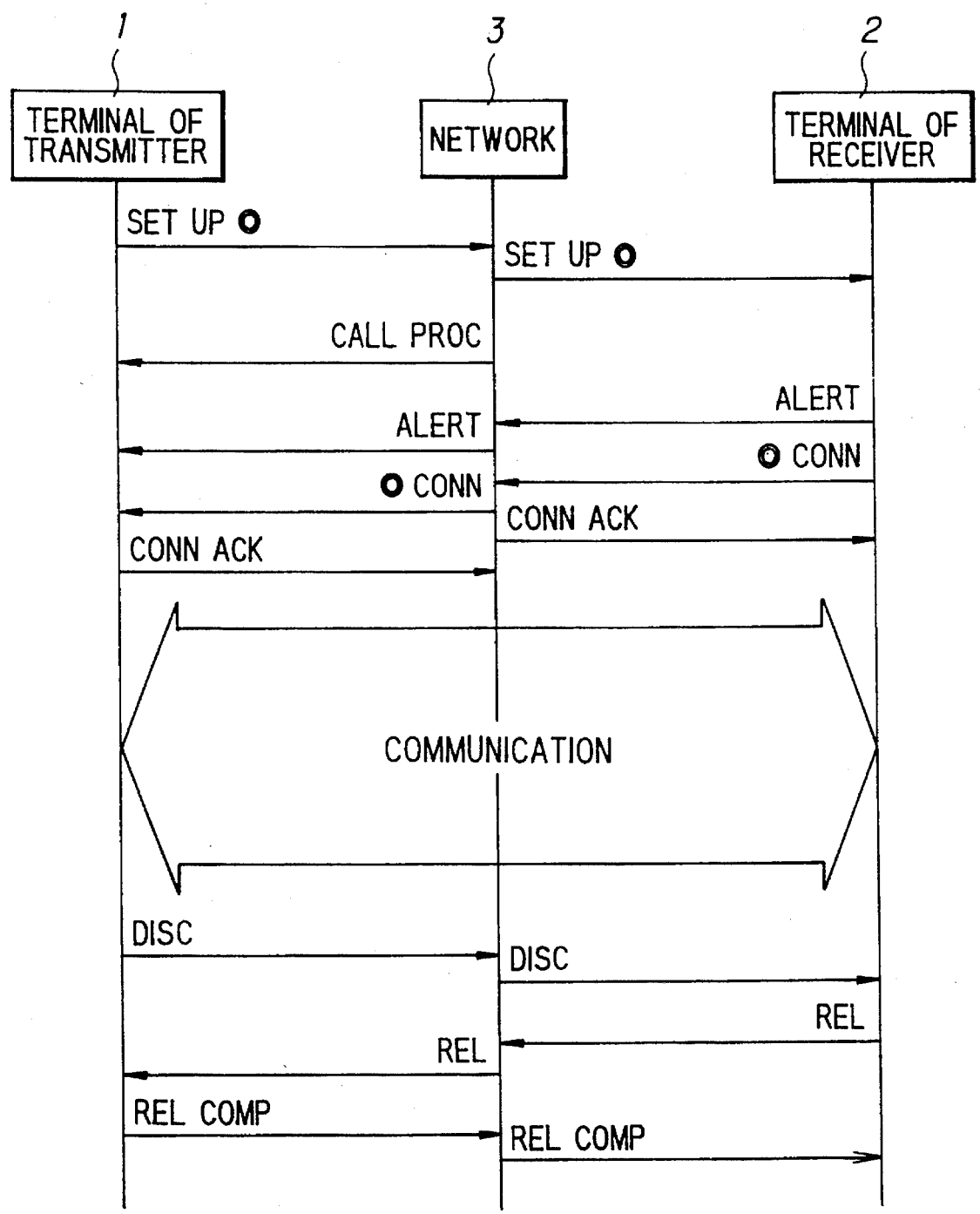
FIG. 17 is an explanatory view of the control procedure between the network and the user in the related art.
Figure 18:
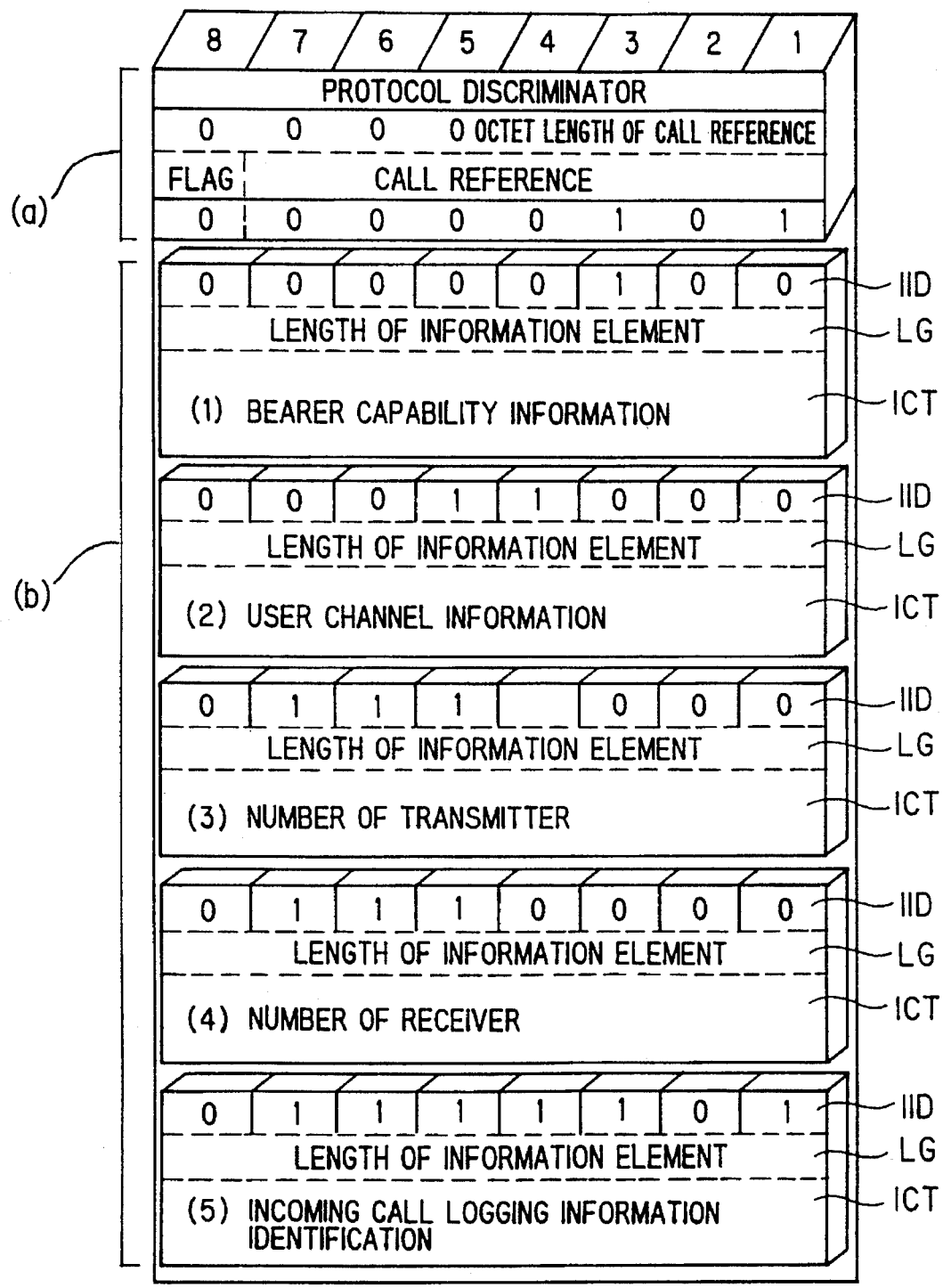
FIG. 18 is an explanatory view of a SET UP message.

FIG. 15 is an explanatory view of the flow of the data in an OSI model in the present invention, and FIG. 16 is an explanatory view of the flow of the data in an OSI model in the related art.

In the present invention, data are transferred in the lower layers in the same way as in the related art, as indicated by the solid line. The communication apparatus of the present invention, however, is different from a conventional one in that the amount of data transmitted is confirmed by reference to a specified portion of the upper layers so as to secure an appropriate band corresponding to the amount of data transmitted before data communication. In this case, since the communication apparatus secures the band before data transfer, communication is not stopped during data transfer, thereby enhancing the reliability and shortening the transfer time. In the case of communicating on the basis of the declared traffic characteristics, the communication apparatus of the present invention declares the traffic characteristics corresponding to the amount of data transmitted to the network. The network communicates on the basis of the declared traffic characteristics and, especially, in the case of communication of data having a high burst probability, data are communicated with the traffic characteristics corresponding to the amount of data transmitted.

As many apparently widely different embodiments of the present invention can be made without departing from the spirit and scope thereof, it is to be understood that the invention is not limited to the specific embodiment thereof except as defined in the appended claims.

What is claimed is:

1. A communication apparatus for communicating between LANs through a wide area network, comprising:

at least one LAN interface portion serving as an interface between a terminal of a LAN and said communication apparatus;

a plurality of wide area network interface portions, disposed between said LAN interface portion and the wide area network, for demultiplexing data that enter from the LAN interface portion, outputting demultiplexed data on a plurality of transmission lines in the wide area network, multiplexing the data input from the wide area network through a plurality of transmission lines, and sending multiplexed data to be LAN interface portion;

an amount-of-data identifying portion for identifying the amount of data to be transferred, by referring to data amount information contained in negotiation information which is transferred from a transmission terminal of the LAN to a reception terminal of the LAN via the wide area network at a time of negotiation prior to data transmission; and a bandwidth controller for calculating a band which is necessary for communication between the LANs on the basis of said amount of data and determining the number of wide area network interface portions for outputting the demultiplexed data on the transmission lines.

2. A communication apparatus according to claim 1, wherein said transmission terminal of the LAN transfers said negotiation information necessary for identifying said amount of data in upper layers of an OSI reference model, and said amount-of-data identifying portion identifies said amount of data from said negotiation information in said upper layers.

3. A communication apparatus for communicating between terminals through a network wherein traffic characteristics including a communication speed is declared to the network prior to communication and the communication between terminals is performed at said communication speed thereafter, said communication apparatus comprising:

a LAN interface portion serving as an interface between a terminal of a LAN and said communication apparatus;

a wide area interface portion serving as an interface between the network and said communication apparatus;

an amount-of-data identifying portion for identifying the amount of data to be transferred, by referring to data amount information contained in negotiation information which is transferred from a transmission terminal of the LAN to a reception terminal of the LAN via the network at a time of negotiation prior to data transmission;

a traffic characteristics calculator for calculating the traffic characteristics at the time of communication on the basis of said amount of data; and a traffic characteristics declaring portion for declaring the calculated traffic characteristics to said network prior to communication.

4. A communication apparatus according to claim 3, wherein the traffic characteristics are calculated on the basis of said amount of data during communication, and the calculated traffic characteristics are declared to said network so as to change said traffic characteristics during communication.

5. A communication apparatus according to claim 3, wherein said transmission terminal of the LAN transfers said negotiation information in upper layers of an OSI reference model, and said amount-of-data identifying portion identifies said amount of data from said negotiation information in said upper layers.

6. A communication apparatus for communicating between LANs through a wide area network, comprising:

LAN interface means for serving as an interface between a terminal of a LAN and said communication apparatus;

wide area network interface means for serving as an interface between said LAN interface means and the wide area network;

amount-of-data identifying means for identifying the amount of data to be transferred, by referring to data amount information contained in negotiation information which is transferred from a transmission terminal of the LAN to a reception terminal of the LAN via the wide area network at a time of negotiation prior to data transmission; and bandwidth control means for determining a band which is necessary for communication between the LANs on the basis of said amount of data.

* * * * *